(12) United States Patent
Kulikov et al.

(10) Patent No.: US 7,562,678 B1
(45) Date of Patent: Jul. 21, 2009

(54) PIPELINE PRESSURE STABILIZER

(76) Inventors: Vadim Gennadyevich Kulikov, Aminevskoe shosse, the house 36, Apt. 90, Moscow (RU); Vladimir Nikolaevich Primenko, Tipografskay Street, the house 24, Apt. 68, Moscow (RU); Valery Anatolievich Zamataev, Shirokaya Street, the house 16, Apt. 236, Moscow (RU)

( * ) Notice: Subject to any disclaimer, the term of this patent is extended or adjusted under 35 U.S.C. 154(b) by 74 days.

(21) Appl. No.: 11/750,779

(22) Filed: May 18, 2007

(51) Int. Cl.
*F16L 55/04* (2006.01)
(52) U.S. Cl. ............................ 138/30; 138/26; 137/207
(58) Field of Classification Search .................. 138/30, 138/26; 137/207
See application file for complete search history.

(56) References Cited

U.S. PATENT DOCUMENTS

| | | | | |
|---|---|---|---|---|
| 2,354,201 A | * | 7/1944 | Dand et al. | 138/30 |
| 2,638,932 A | * | 5/1953 | Alexander | 138/30 |
| 2,808,070 A | * | 10/1957 | Malsbary | 138/26 |
| RE24,390 E | * | 11/1957 | Everett | 138/30 |
| 3,536,102 A | * | 10/1970 | Zahid | 138/30 |
| 3,625,242 A | * | 12/1971 | Ostwald | 138/30 |
| 4,163,461 A | * | 8/1979 | Jacobellis | 138/30 |
| 4,432,393 A | * | 2/1984 | Mills | 138/30 |
| 4,759,387 A | * | 7/1988 | Arendt | 138/30 |
| 6,672,337 B2 | * | 1/2004 | Kobayashi et al. | 138/30 |

* cited by examiner

*Primary Examiner*—Patrick F Brinson
(74) *Attorney, Agent, or Firm*—Gold & Rizvi, P.A.; Glenn E. Gold; H. John Rizvi

(57) ABSTRACT

A pressure stabilizer for mediating changes in pressure within a pipeline is provided. The pressure stabilizer incorporates a plurality of perforations about a central pipeline and a circumferential enclosure about the perforations. This structure allows excess fluid to flow from the central pipeline into the space provided between the central pipeline and the circumferential enclosure. As the pressure increases within the overflow space, the medium applies a pressure to an elastomeric membrane, which in turn transfers the pressure to a plurality of dampening materials. The elastomeric membrane can be filled with a porous material providing a smoother transition within the pressure dampening process. The elastomeric membrane and respective dampening materials can be placed within the circumferential enclosure assembled about the central pipeline or utilized with a pressure-stabilizing chamber.

20 Claims, 7 Drawing Sheets

Section 4-4

PIPELINE PRESSURE STABILIZER

FIELD OF THE INVENTION

This invention relates generally to the art of pipeline systems, and more particularly a method and apparatus for stabilizing the pressure within a pipeline.

BACKGROUND OF THE INVENTION

Pipelines are used to transport stable fluids (pure fluids) and complex fluids (such as oils, sewage, etc. and normally characterized having relatively large particles, gasses and the like, mixed in the fluid). Pipelines are subjected to severe wear, with the average wear of the pipeline systems and equipment exceeding 65%. According to official data, the annual number of ruptures and accidents within the housing and utilities infrastructure in Russia exceeds 600,000 incidents. Accidents in pipelines that carry hazardous materials such as oil, chemical, and other such harsh mediums can bring about harsh environmental and social consequences.

Pipeline failures are generally broken down as follows:

a. 60% result from hydraulic surges, pressure changes, and vibrations;

b. 25% result from corrosion; and c. 15% result from natural phenomena and force majeure circumstance.

Pneumo-hydraulic devices are subject to changes in pressure. An example includes a pressure pipeline during pumping of a working medium, wherein the pressure changes as a result of the pressure pump systems and the impacts occurring by the closure of valves and valve gates.

The pressure can be imparted many forms, including, for example, a moving wave transmitted through the pipeline. Additionally, extreme hazardous conditions such as forces matching resonance frequencies can occur.

What is desired is an apparatus that stabilizes the pressure fluctuations within a pipeline. In addition to preventing ruptures and related hazardous conditions, it would be desirable to provide such an apparatus which minimizes, and preferably eliminates, audible sounds that often emanate from pipes under pressure (i.e., sometimes referred to as the "singing pipe" problem). At one end of the spectrum, such noises can be annoying to hear, e.g., emanating from plumbing conduits. At the other end of the spectrum, such noises can kill fish and other sea life, which can also result in major fines for businesses responsible for the pipes.

SUMMARY OF THE PRESENT INVENTION

A first aspect of the present invention to provide an apparatus that stabilizes the pressure within a pipeline.

Yet another aspect of the present invention provides an apparatus that stabilizes the pressure within a pipeline used to transport a stable fluid.

Yet another aspect of the present invention provides a spring force as a means for stabilizing the pressure within a section of pipeline.

Yet another aspect of the present invention provides a dampening force as a means for stabilizing the pressure within a section of pipeline.

Yet another aspect of the present invention provides both a spring force and a dampening force as a means for stabilizing the pressure within a section of pipeline.

Yet another aspect of the present invention provides pipeline stabilization via a series of central pipeline perforations within a central pipeline and a cylindrical central pipeline enclosure placed about the central pipeline.

Yet another aspect of the present invention provides pipeline stabilization via a series of central pipeline perforations within a central pipeline, and a cylindrical central pipeline enclosure placed about said central pipeline, wherein the series of central pipeline perforations provides a path for the fluid to flow between the central pipeline and the cylindrical central pipeline enclosure.

Yet another aspect of the present invention provides a pressure-stabilizing chamber fluidly connected to at least one of the central pipeline and the cylindrical central pipeline enclosure.

Yet another aspect of the present invention provides a pressure-stabilizing chamber fluidly connected to at least one of the central pipeline and the cylindrical central pipeline enclosure via a pressure control conduit.

Yet another aspect of the present invention provides a pressure stabilizing chamber fluidly connected to at least one of the central pipeline and the cylindrical central pipeline enclosure, wherein the pressure stabilizing chamber is oriented substantially parallel to the pipeline.

Yet another aspect of the present invention provides a pressure stabilizing chamber fluidly connected to at least one of the central pipeline and the cylindrical central pipeline enclosure, wherein the pressure stabilizing chamber is oriented substantially perpendicular to the pipeline.

Yet another aspect of the present invention provides a pressure-stabilizing chamber comprising an elastic pressure membrane member.

Yet another aspect of the present invention provides a pressure-stabilizing chamber comprising an elastic membrane member providing a spring force against a fluid pressure force applied resulting from an increase in pressure within the pipeline.

Yet another aspect of the present invention provides a pressure-stabilizing chamber comprising an elastic membrane member, the elastic membrane member providing a spring force against a fluid pressure force applied as a result of an increase in pressure within the pipeline; the elastic membrane member being fabricated of a molded rubber compound.

Yet another aspect of the present invention provides a pressure-stabilizing chamber comprising a dampening material, the dampening material providing a dampening force against a fluid pressure force applied resulting from an increase in pressure within the pipeline.

Yet another aspect of the present invention provides a pressure-stabilizing chamber comprising a dampening material, the dampening material providing a dampening force against an applied fluid pressure force resulting from an increase in pressure within the pipeline, the dampening material being assembled within a dampening chamber.

Yet another aspect of the present invention provides a pressure-stabilizing chamber comprising a dampening material fabricated from a composite material such as Polyethylene and rubber or Silicone and rubber.

Yet another aspect of the present invention provides a pressure-stabilizing chamber comprising a dampening material fabricated from a composite material such as Polyethylene and rubber or Silicone and rubber, wherein the rubber further comprises chopped up sections of used tires.

Yet another aspect of the present invention provides a pressure-stabilizing chamber comprising an elastic membrane member and a dampening material, the elastic membrane member providing a spring force against a fluid pressure force applied resulting from an increase in pressure within the pipeline, and the dampening material providing a dampening force against a fluid pressure force applied resulting from an increase in pressure within the pipeline.

Yet another aspect of the present invention provides a pressure-stabilizing chamber comprising an elastic membrane member which contacts a dampening material, the combination elastic membrane member and dampening material providing a spring and dampening force against a fluid pressure force applied as a result of an increase in pressure within the pipeline.

Yet another aspect of the present invention is the utilization of an elastic membrane member comprising a dampening material of a first dampening coefficient, and a dampening chamber dampening material of a second dampening coefficient.

Yet another aspect of the present invention is an increase of work effectiveness by a reduction of persistence of hydraulic path, which connects the central pipeline with the damping buildup, hydraulic, and wave resistance of hydraulic paths.

Yet another aspect of the present invention is an increase of suppleness of the damping cavity in the dynamic operation mode of the pipeline system by a prior ramming of the porous elastic and damping filler of the damping chamber with a force close to the operation pressure in the period of filling the dampening chamber.

BRIEF DESCRIPTION OF THE DRAWINGS

For the purpose of initially illustrating the invention, the specification presents drawings, flow diagrams, and embodiments that are presently preferred as well as alternates. It should be understood, however, that the invention is not limited to the specific instrumentality and methods disclosed herein. It can be recognized that the figures represent a layout in which persons skilled in the art may make variations therein. In the drawings.

DETAILED DESCRIPTION OF THE DRAWING

Figure 1:
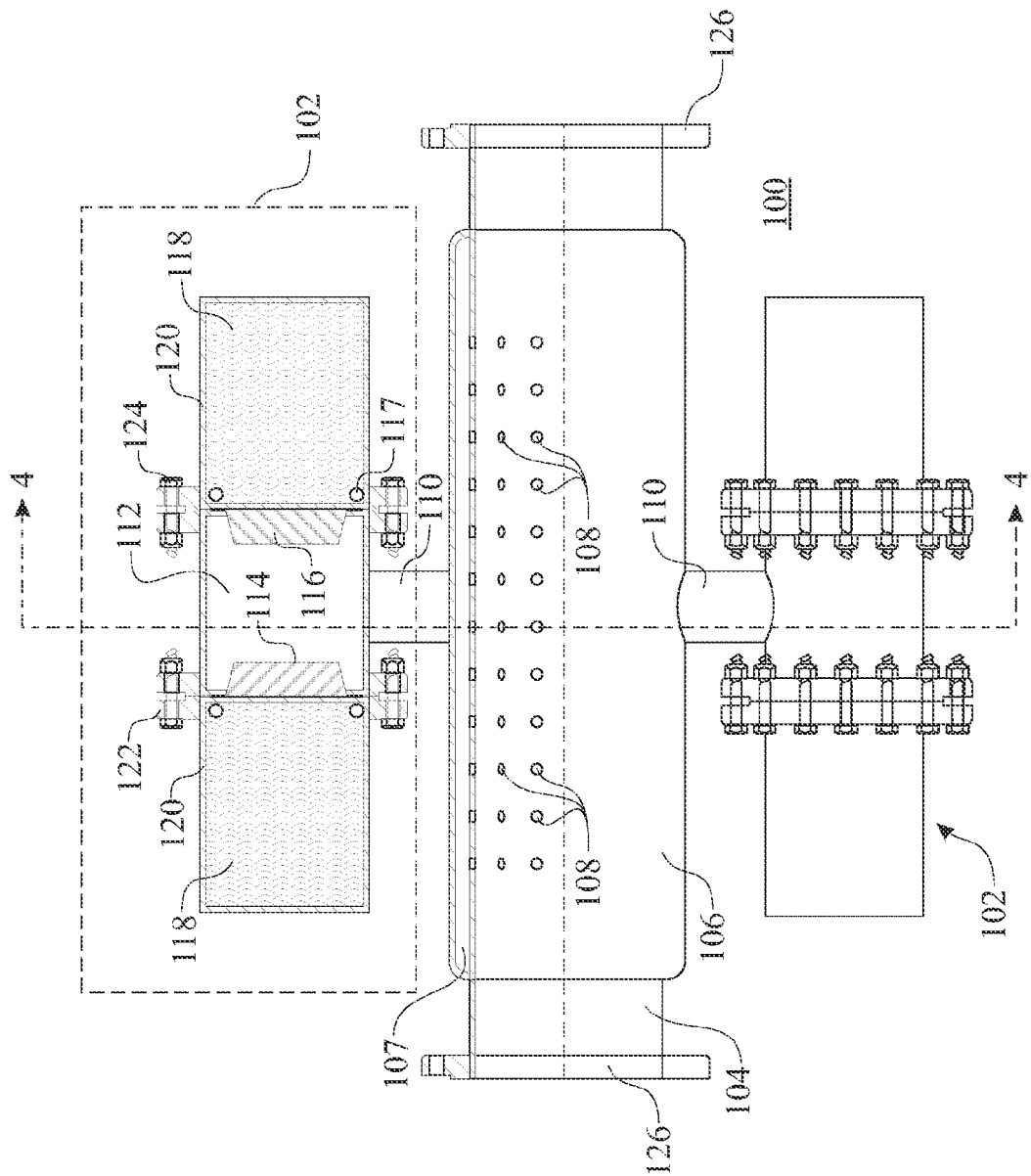
FIG. 1 presents an elevation view, including a partial sectional cut of a pipeline pressure stabilizer exemplary embodiment of the present invention.

FIG. 1 illustrates an elevation view of a pressure stabilized pipeline system 100, including a partial sectional view above the centerline of the pressure stabilized pipeline system 100. The pressure stabilized pipeline system 100 comprises at least one pressure stabilizing chamber 102 connected with fluid communication between a cylindrical central pipeline pressure stabilizing enclosure 106 and a pressure control receptacle(s) 112 of the pressure stabilizing chamber 102 via pressure control conduit(s) 110. The cylindrical central pipeline pressure stabilizing enclosure 106 is assembled completely enclosing a section of said central pipeline 104. Said central pipeline 104 comprising a plurality of central pipeline perforations 108, wherein pumped medium can flow form said central pipeline 104 via the plurality of central pipeline perforations 108 into the dampening buildup section 107 of the cylindrical central pipeline pressure stabilizing enclosure 106. The central pipeline perforations 108 perform dissipation of the fluid, in much the same manner as Alveoli in human lungs. It is preferred that the central pipeline perforations 108 are evenly distributed about a wall of the central pipeline 104. The pressure-stabilizing chamber 102 comprises at least one elastic pressure membrane 114, wherein a highly porous elastomer 116 can be coupled to, or placed within, the elastic pressure membrane 114 as a contributor to a dampening force. A dampening chamber 120, comprising a dampening porous material 118, is assembled proximate the elastic pressure membrane 114 on a side opposing the pressure control receptacle(s) 112. The dampening porous material 118 can be a composite comprising Polyethylene and Rubber, Silicone and Rubber, and the like. The dampening porous material 118 is fabricated of at least two materials, wherein a first material and second material do not bind to each other. One such composition of the dampening porous material 118 can be manufactured by grinding used tires and pouring in a filler material such as Polyethylene. The dampening chamber 120 can be coupled to the pressure control receptacle(s) 112 via a stabilizing chamber assembly flange 122, wherein the stabilizing chamber assembly flange 122 is mechanically secured with a plurality of flange fastener(s) 124. The flange fastener(s) 124 are typically nuts, bolts, and washers engineered to meet the overall system requirements and respective safety factors. The material used for fabrication of the highly porous elastomer 116 is preferably distinctly different from the material used for fabrication of the dampening porous material 118. The material used for fabrication of the highly porous elastomer 116 is an elastomer having a high porosity. The material used for fabrication of the dampening porous material 118 is a dampening porous material. The elastic pressure membrane 114 is mechanically secured into the pressure-stabilizing chamber 102 such that it is sandwiched between each of the stabilizing chamber assembly flanges 122. The elastic pressure membrane 114 can be mechanically supported via a membrane support ring 117. The membrane support ring 117 can be any design engineered sufficiently to accommodate the required pressure and safety factors. The pressure stabilized pipeline system 100 can be integrated into the pipeline by securing the pressure stabilized pipeline system 100 to other pipeline members via a central piping assembly flange 126 and respective fasteners, such as the flange fastener(s) 124. It is recognized and illustrated that the pressure stabilized pipeline system 100 can comprise a pair of the central piping assembly flange(s) 126, with one located proximate each end of the section of the central pipeline 104.

Figure 2:
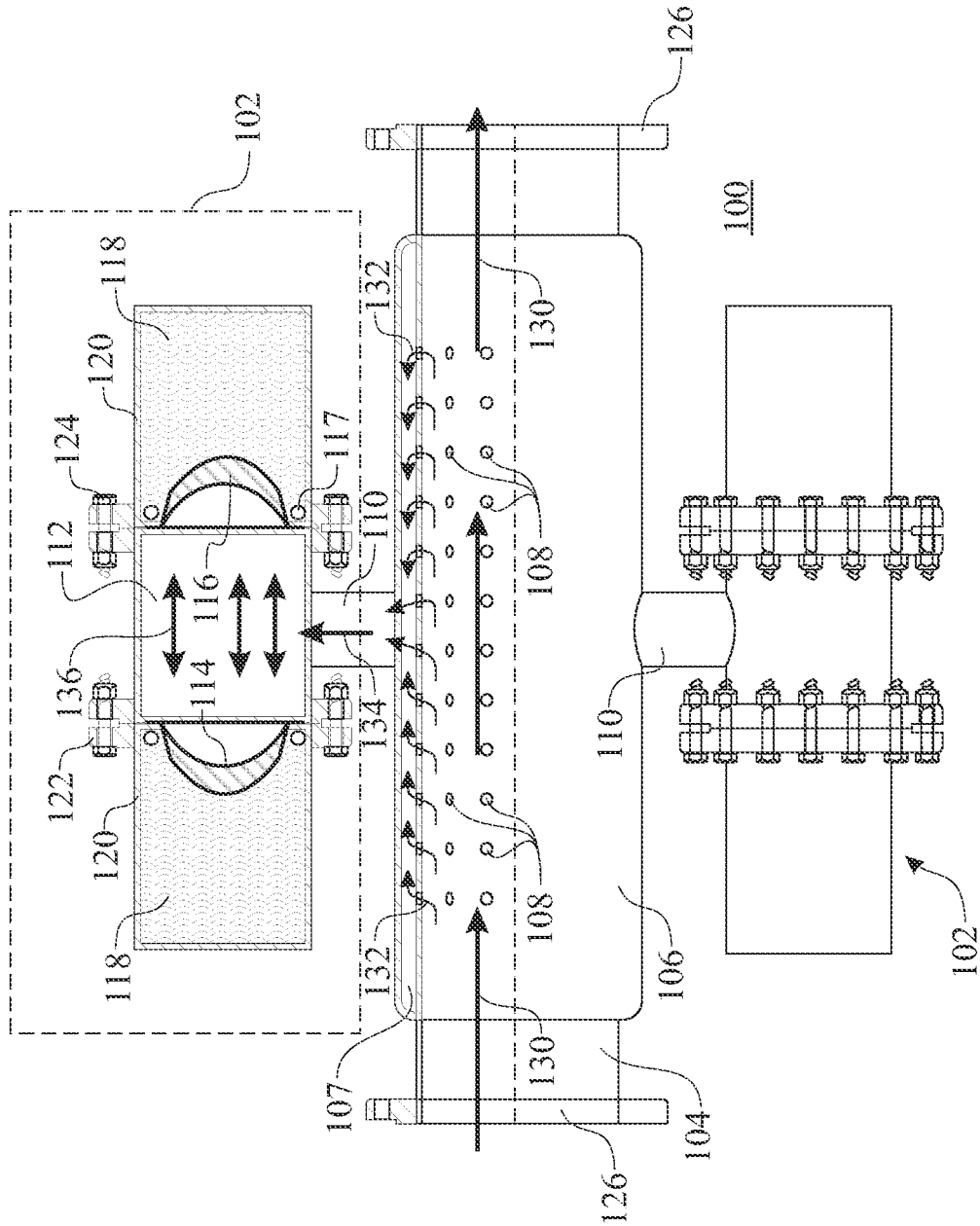
FIG. 2 presents the exemplary embodiment presented in FIG. 1, illustrating an excessive pressure condition.
Figure 3:
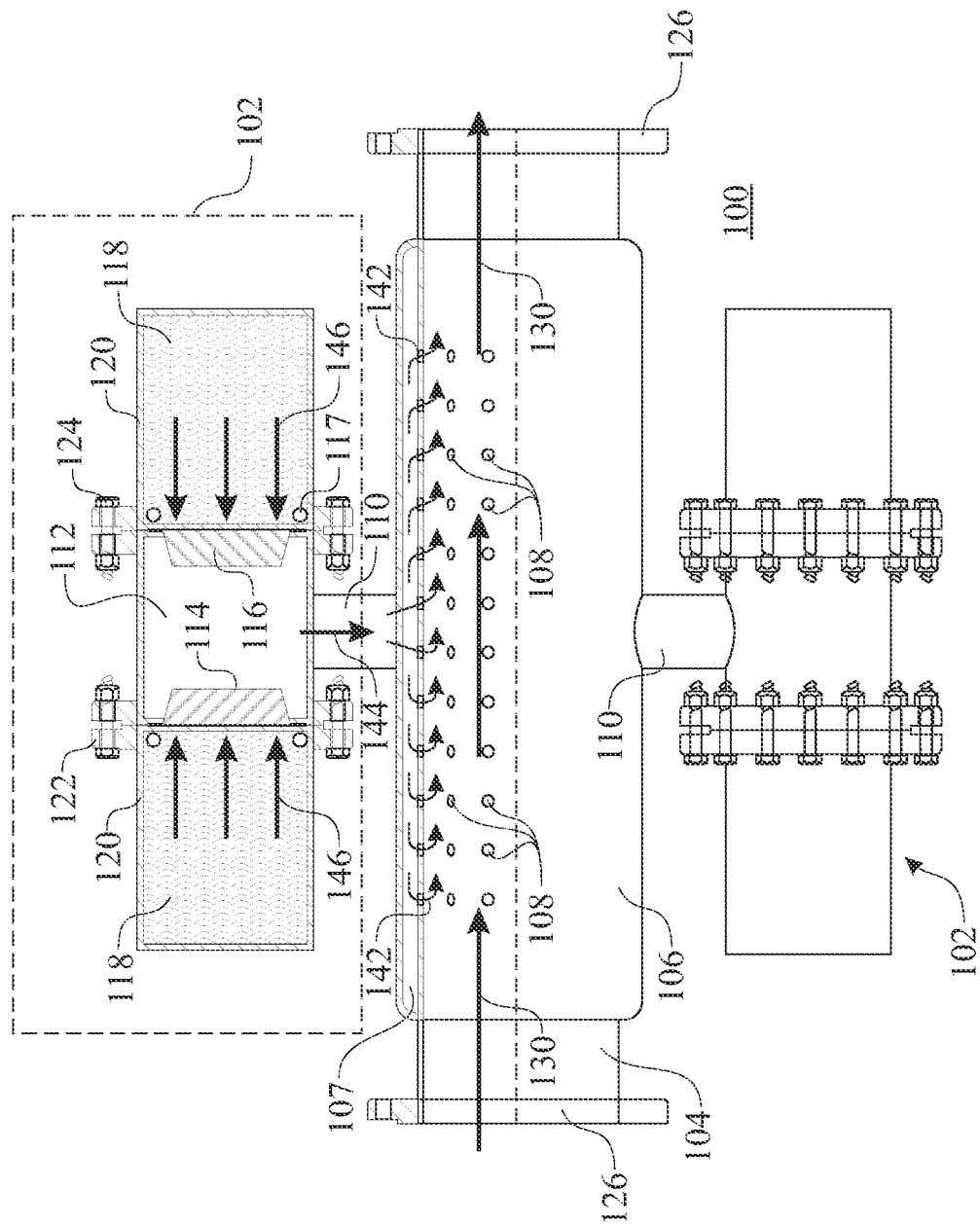
FIG. 3 presents the exemplary embodiment presented in FIG. 1, illustrating an reducing pressure condition.

FIGS. 2 and 3 illustrate the operation of the present invention, wherein FIG. 2 represents the pressure stabilized pipeline system 100 during an increasing pressure phase, and FIG. 3 presents the pressure stabilized pipeline system 100 during a decreasing pressure phase. An increasing pressure event can arise in the central pipeline 104 via a hydraulic impact, forced pressure oscillations, and the like. A working medium flow 130 passes through the central pipeline 104. As the working medium flow 130 passes through the central pipeline 104, when the working medium flow 130 is subject to an increase in pressure, a wave ensues, and the medium and any pressurized material flows in accordance to an excess fluid flow path 132. Continued flow in accordance with the excess fluid flow path 132 causes the dampening buildup section 107 to fill. As the dampening buildup section 107 fills, excess medium then flows as excess pressurized fluid flow 134 through the pressure control conduits 110 and begins to fill the pressure control receptacle(s) 112. As the medium continues as excess pressurized fluid flow 134, the pressure control receptacle(s) 112 fills and pressurizes, generating a dampened pressure force 136. The dampened pressure force 136 is first dampened by a motion of the elastic pressure membrane 114 and the highly porous elastomer 116 coupled to the elastic pressure membrane 114. As the dampened pressure force 136 increases, the elastic pressure membrane 114 continues to expand into the dampening chamber 120, thereby compressing the dampening porous material 118. This continues until the volume of flow/pressure within the central pipeline 104 becomes less than the forces (a dampening return pressure force 146) applied to medium currently accumulated in the pressure control receptacle(s) 112. The dampening return pressure force 146 begins to return the accumulated medium towards the dampening buildup section 107, in accordance with a dampened pressure return flow 144. As the medium continues to return to the dampening buildup section 107, the medium returns to the working medium flow 130 via a reduced pressure return flow 142, flowing the medium through the plurality of the central pipeline perforations 108 and ultimately back to the working medium flow 130.

By providing the pressure stabilized pipeline system 100, the elastic pressure membrane 114 and the dampening porous material 118, in conjunction with the fluid collecting capabilities within the dampening buildup section 107 and the pressure control receptacle(s) 112, the system reduces the overall amplitude and frequency of changes in pressure of medium within the central pipeline 104. Essentially, the increase in work provided by the dampening materials of the pressure stabilized pipeline system 100 results in a decrease in persistence, hydraulic, and wave reduction of the fluid flow path.

Figure 4:
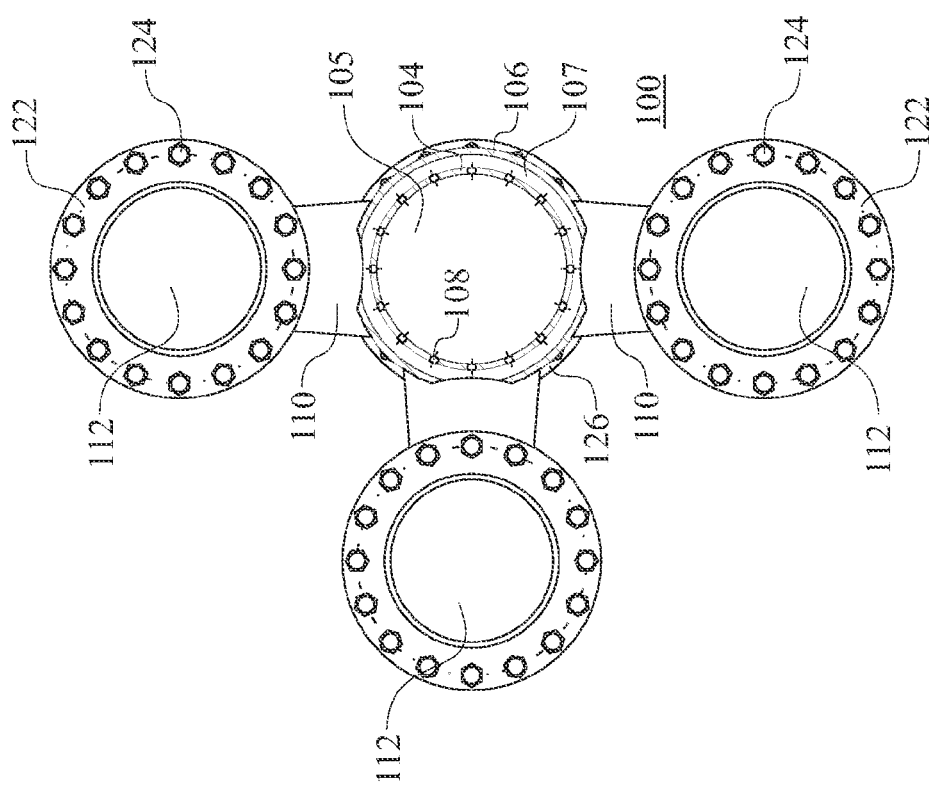
FIG. 4 presents an elevation, end sectional view of the exemplary embodiment presented in FIG. 1.
Figure 5:
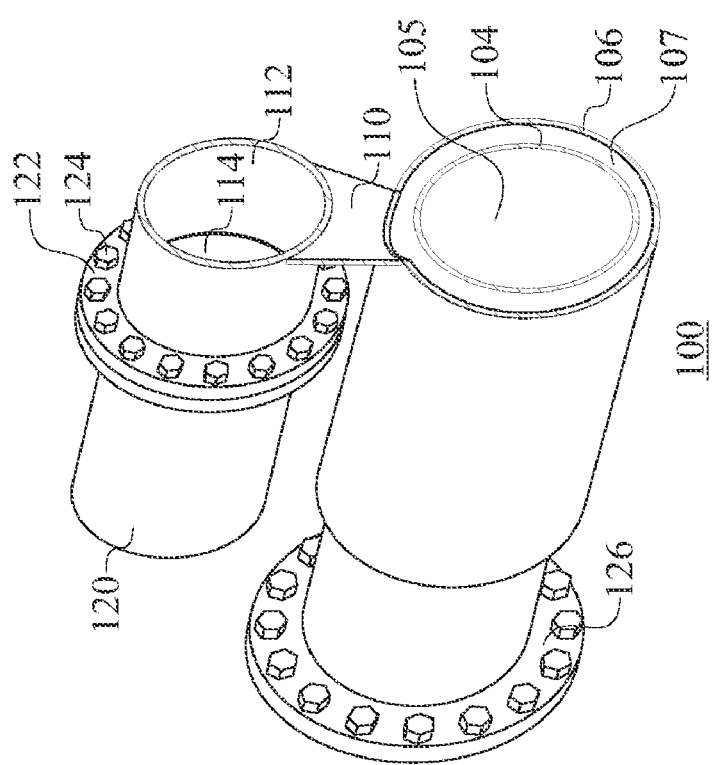
FIG. 5 presents an isometric, sectional view of the exemplary embodiment presented in FIG. 1.

FIGS. 4 and 5 illustrate a cross-sectional view 4-4 of FIG. 1. FIG. 4 illustrates an elevation view and FIG. 5 illustrates an isometric illustration for additional clarity. The illustration presents the central pipeline 104, which provides a central pipeline conduit 105 for the working medium flow 130. A plurality of the central pipeline perforations 108 provides fluid connectivity between the central pipeline conduit 105 and the dampening buildup section 107. The dampening buildup section 107 is a chamber created between the central pipeline 104 and the cylindrical central pipeline pressure-stabilizing enclosure 106, as illustrated. The dampening buildup section 107 is fluidly connected between the dampening buildup section 107 and the pressure control receptacle (s) 112 via a plurality of the central pipeline perforations 108. Peering into the pressure control receptacle(s) 112, one would find an elastic pressure membrane 114 (not shown for clarity).

Figure 6:
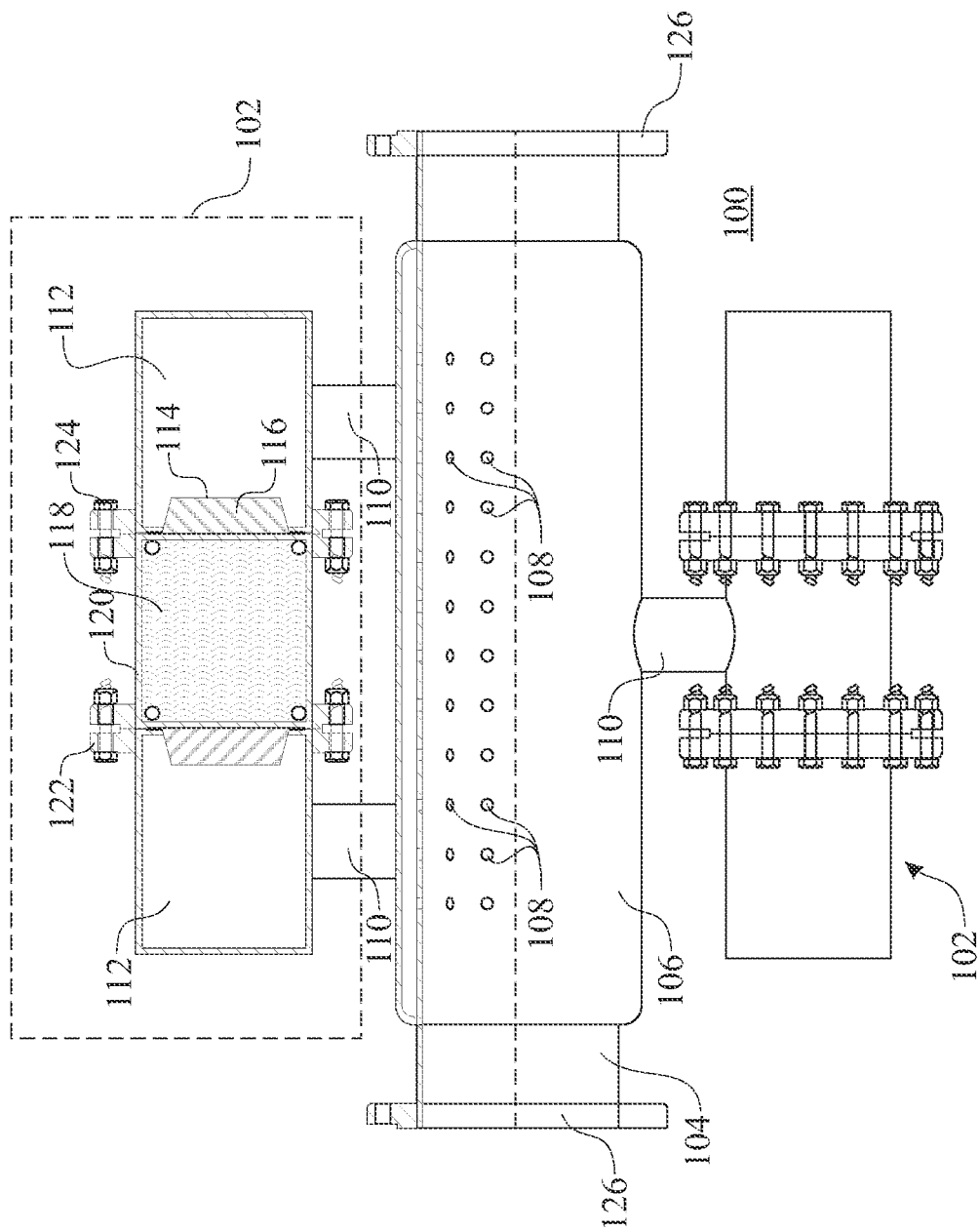
FIG. 6 presents an elevation view, including a partial sectional cut of an alternate pipeline pressure stabilizer exemplary embodiment of the present invention.

FIG. 6 presents an elevation view of the pressure stabilized pipeline system 100, presenting an alternate exemplary embodiment of the present invention. The pressure-stabilizing chamber 102 comprises a pair of the pressure control receptacle(s) 112 positioned at opposing ends of the pressure-stabilizing chamber 102, and a dampening chamber 120 comprising the dampening porous material 118 oriented between the pair of the pressure control receptacle(s) 112. A pressure control conduit 110 is provided for each of the respective pressure control receptacle(s) 112. The elastic pressure membrane 114 is assembled to accept pressure applied by medium flowing into the pressure control receptacle(s) 112 such that, as the elastic pressure membrane 114 expands, the elastic pressure membrane 114 applies an expansion force into the dampening porous material 118.

Figure 7:
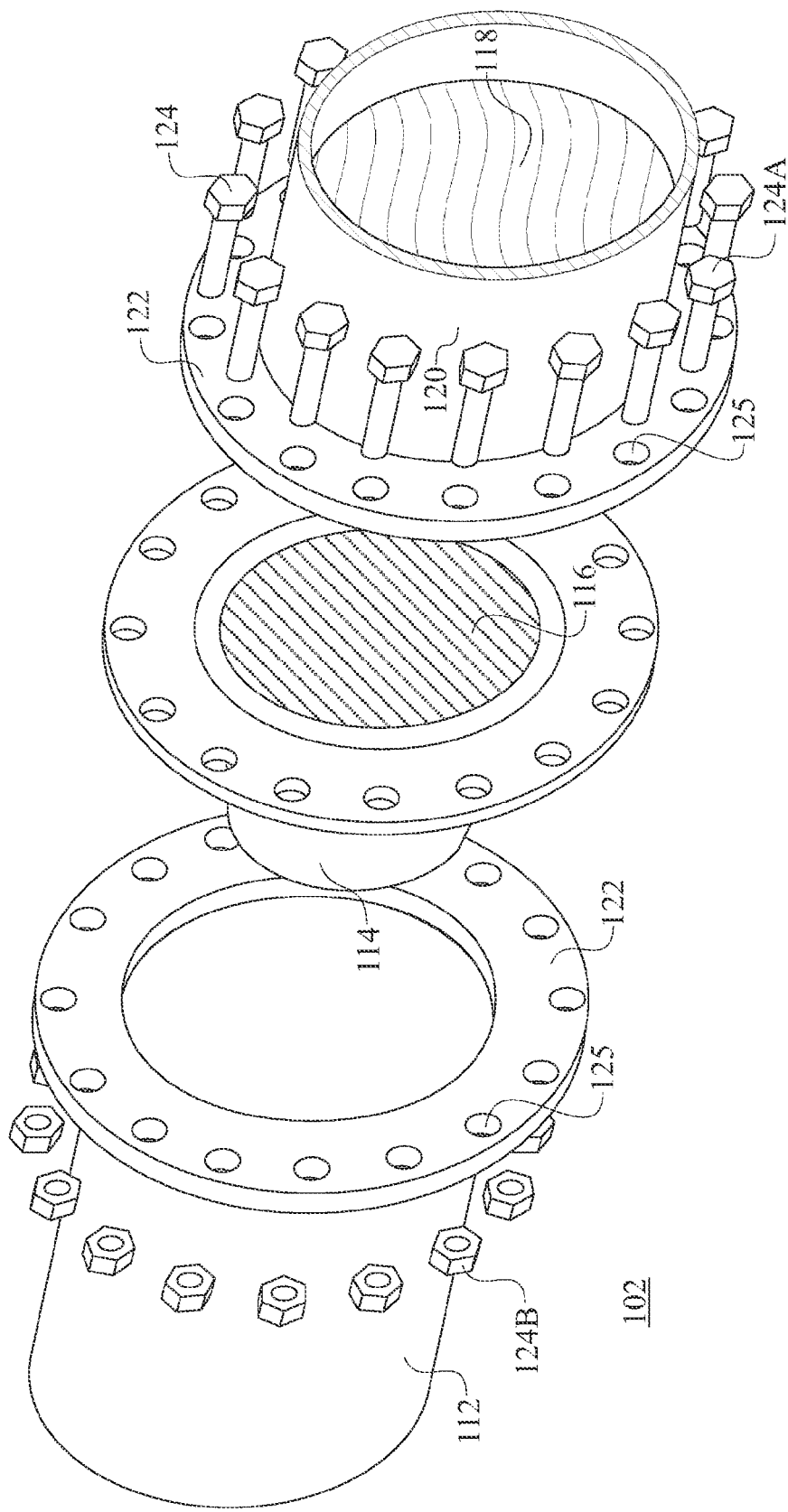
FIG. 7 presents an isometric view of an assembly drawing of the key components of the present invention.

FIG. 7 presents an isometric assembly view of a section of the pressure-stabilizing chamber 102. An elastic pressure membrane 114 is assembled at an interface between the pressure control receptacle(s) 112 and the highly porous elastomer 116; more specifically, between a pair of the stabilizing chamber assembly flange(s) 122. The pressure control receptacle(s) 112 and the highly porous elastomer 116 are mechanically coupled via a plurality of the flange fastener(s) 124, wherein the flange fastener(s) 124 comprise a bolt 124A placed through a respective flange-coupling aperture 125 and secured via a nut 124B. Optional washers (not shown) can be incorporated as desired. It is well recognized that fasteners other than nuts 124B and bolts 124A can be utilized as designed by a system engineer. The elastic pressure membrane 114 is captured between the pair of the stabilizing chamber assembly flange 122 as one form of assembly. Alternately, the elastic pressure membrane 114 can be coupled to the inside wall of the pressure control receptacle(s) 112 or highly porous elastomer 116. The dampening porous material 118 is placed within the dampening chamber 120 and positioned proximate or contacting the respective plane of the elastic pressure membrane 114, with any exposed portion of the highly porous elastomer 116 sandwiched between the elastic pressure membrane 114 and the dampening porous material 118.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The Applicant has provided a method and apparatus, with several options, for creating and using an pressure stabilizing device in conjunction with a working medium pipeline. Although the apparatus and methods taught herein are the preferred and alternate embodiments, it can be recognized that other form factors, materials, and methods of achieving the same results can be contrived from the disclosed teachings.

What is claimed is:

1. A pressure stabilizing system, comprising:
    a central pipeline, including a first central piping assembly flange and a second central piping assembly flange for connecting the central pipeline inline with additional pipeline members, said central pipeline having a plurality of perforations provided therein;
    a pressure stabilizing pipeline enclosure placed about the central pipeline;
    an annular dampening buildup section of fixed volume defined between the central pipeline and the pressure stabilizing pipeline enclosure and disposed in fluid communication with the central pipeline;
    a pressure control receptacle fluidly coupled to the dampening buildup section;
    an elastic pressure membrane positioned between a flange of the pressure control receptacle and a flange of a dampening chamber, the elastic pressure membrane oriented to receive a pressurized fluid placed within the pressure control receptacle; and
    a dampening material positioned within the dampening chamber and located proximate the elastic pressure membrane on a side opposing a pressurized fluid contacting side, wherein when the pressurized fluid expands the elastic pressure membrane applies a pressure to the dampening material.

2. A pressure stabilizing system as recited in claim 1, further comprising:
    a plurality of said pressure control receptacles;
    each pressure control receptacle fluidly coupled to the central pipeline;

each pressure control receptacle coupled to at least one dampening chamber;
said elastic pressure membrane positioned between a flange of the pressure control receptacle and a flange of the dampening chamber; and
said dampening material positioned within each the dampening chamber.

3. A pressure stabilizing system as recited in claim 1, wherein the perforations are evenly distributed along the central pipeline.

4. A pressure stabilizing system as recited in claim 1, wherein the pressure control receptacle is fluidly coupled to the pressure stabilizing pipeline enclosure via a pressure control conduit placed between the pressure stabilizing pipeline enclosure and the pressure control receptacle.

5. A pressure stabilizing system as recited in claim 1, wherein the dampening material is fabricated of at least two of silicone, polyethylene, and rubber sections, each of said materials combined in a non-binding manner.

6. A pressure stabilizing system as recited in claim 1, wherein the dampening material is fabricated from cut sections of used tires.

7. A pressure stabilizing system as recited in claim 1, wherein the dampening material is fabricated of at least one of silicone, polyethylene and chopped sections of used tires, each of said materials not assembled in a non-binding manner.

8. A pressure stabilizing system, comprising:
a central pipeline, the central pipeline comprising a first central piping assembly flange and a second central piping assembly flange for connecting a central pipeline inline with additional pipeline members, said central pipeline including a plurality of perforations therein;
a pressure stabilizing pipeline enclosure placed about the central pipeline;
an annular dampening buildup section of fixed volume defined between the central pipeline and the pressure stabilizing pipeline enclosure and disposed in fluid communication with the central pipeline;
a pressure control receptacle fluidly coupled to the dampening buildup section;
an elastic pressure membrane positioned between a flange of the pressure control receptacle and a flange of a dampening chamber, the elastic pressure membrane oriented to receive a pressurized fluid placed within the pressure control receptacle;
a highly porous elastomer coupled to the elastic pressure membrane;
a dampening material positioned within the dampening chamber and located proximate the elastic pressure membrane on a side opposing a pressurized fluid contacting side, wherein when the pressurized fluid expands the elastic pressure membrane the elastic pressure membrane applies a pressure to the dampening material,
wherein, the elastic pressure membrane provides a fluid boundary between the pressure control receptacle and the dampening material.

9. A pressure stabilizing system as recited in claim 8, wherein the perforations are evenly distributed along the central pipeline.

10. A pressure stabilizing system as recited in claim 8, wherein the pressure control receptacle is fluidly coupled to the pressure stabilizing pipeline enclosure via a pressure control conduit placed between the pressure stabilizing pipeline enclosure and the pressure control receptacle.

11. A pressure stabilizing system as recited in claim 8, wherein the dampening material is fabricated of at least two of silicone, polyethylene, and rubber sections, and each of said materials are not assembled in a non-binding manner.

12. A pressure stabilizing system as recited in claim 8, wherein the dampening material is fabricated of cut sections of used tires.

13. A pressure stabilizing system as recited in claim 8, wherein the dampening material is fabricated of at least one of silicone, polyethylene, and chopped sections of used tires, each of said materials not assembled in a non-binding manner.

14. A pressure stabilizing system, comprising:
a central pipeline including a first central piping assembly flange and a second central piping assembly flange for connecting a central pipeline inline with additional pipeline members;
an annular dampening buildup section of fixed volume encircling the central pipeline and disposed in fluid communication with the central pipeline;
a pressure control receptacle having a fluid-receiving space fluidly coupled to the dampening buildup section;
an elastic pressure membrane positioned between and secured via a flange of the pressure control receptacle and a flange of a dampening chamber, the elastic pressure membrane oriented to receive a pressurized fluid placed within the fluid-receiving space of the pressure control receptacle;
a highly porous elastomer coupled to the elastic pressure membrane; and
a dampening material positioned within the dampening chamber and located proximate the elastic pressure membrane on a side opposing a pressurized fluid contacting side, wherein when the pressurized fluid expands the elastic pressure membrane the elastic pressure membrane applies a pressure to the dampening material,
wherein the elastic pressure membrane provides a fluid boundary between the pressure control receptacle and the dampening material.

15. A pressure stabilizing system as recited in claim 14, the dampening material fabricated of at least two of silicone, polyethylene, and rubber sections, each of said materials not assembled in a non-binding manner.

16. A pressure stabilizing system as recited in claim 14, wherein the dampening material is fabricated of cut sections of used tires.

17. A pressure stabilizing system as recited in claim 14, wherein the dampening material is fabricated of at least one of silicone, polyethylene and chopped sections of used tires, each of said materials not assembled in a non-binding manner.

18. A pressure stabilizing system as recited in claim 14, further comprising a pair of dampening chambers attached to each opposing end of the pressure control receptacle.

19. A pressure stabilizing system as recited in claim 18, further comprising a pair of elastic pressure membranes, each assembled between each of the opposing ends of the pressure control receptacle and the respective dampening chamber.

20. A pressure stabilizing system as recited in claim 14, the pressure stabilizing system further comprising:
a plurality of said pressure control receptacles;
each pressure control receptacle fluidly coupled to the central pipeline;
each pressure control receptacle coupled to at least one dampening chamber;
wherein the elastic pressure membrane is positioned between a flange of the pressure control receptacle and a flange of the dampening chamber; and
the dampening material is positioned within each the dampening chamber.

* * * * *